Aug. 18, 1931.   W. T. BRENNEN   1,819,865
STEEL STRUT WHEEL
Filed June 25, 1930
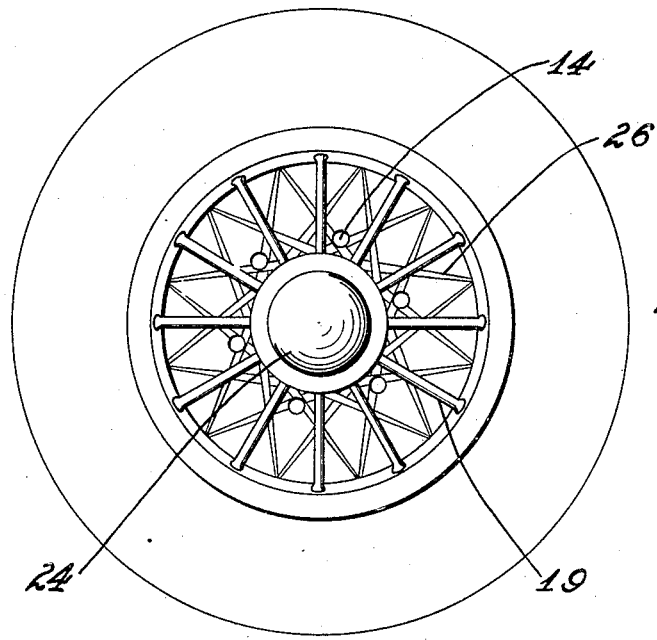
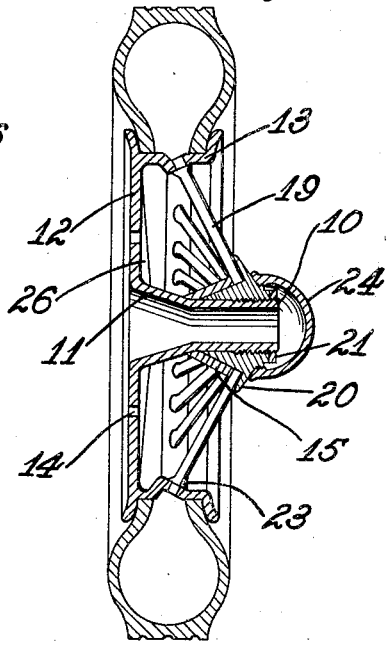
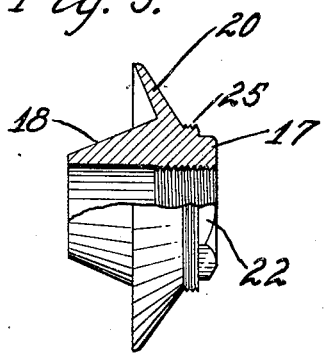
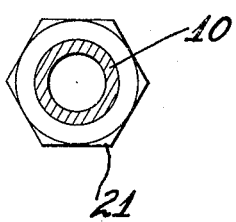
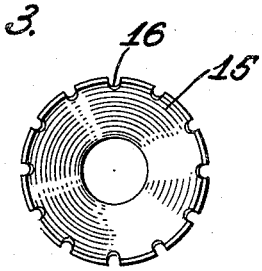
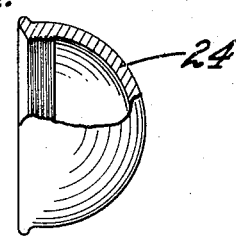
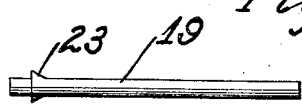
William T. Brennen.
INVENTOR
BY Victor J. Evans
ATTORNEY
WITNESS: George L. Ogle.

Patented Aug. 18, 1931

1,819,865

UNITED STATES PATENT OFFICE

WILLIAM T. BRENNEN, OF BRIDGEPORT, PENNSYLVANIA

STEEL STRUT WHEEL

Application filed June 25, 1930. Serial No. 463,781.

This invention relates to certain new and useful improvements in wheel construction adapted for employment upon motor vehicles and the like.

One of the principal objects of the invention consists of a hub structure and disk to be coupled with the vehicle brake drums in the ordinary manner.

Another object of the invention contemplates the provision and arrangement of strut elements bracing the rim with relation to the hub.

More specifically stated the strut elements are adjustably and removably secured by means of which the various parts may be readily removed and replaced.

With the above and other objects in view, the invention further consists of the following novel features and details of construction, to be hereinafter more fully described, illustrated in the accompanying drawings and pointed out in the appended claim.

In the drawings:—

Figure 1 is a front elevation of the present form of wheel construction.

Figure 2 is a horizontal sectional view taken therethrough.

Figure 3 is a top plan view of a strut receiving portion.

Figure 4 is a side elevation of the wheel hub cap partly broken away to illustrate the construction thereof.

Figure 5 is a side elevation of the adjusting means for the struts, partly in section.

Figure 6 is an end elevation of the hub with a locking element applied.

Figure 7 is an elevation of one of the struts.

Referring to the drawings in detail wherein like characters of reference denote corresponding parts, the reference character 10 indicates generally a form of hub having an enlarged outwardly and rearwardly flared portion 11 to accommodate the usual spline or key connections, not shown, between the vehicle brake drums and axles of the rear wheels. It is obviously apparent that bearing struts for the front or steering wheels of vehicles may be readily built up in the hub structure without requiring alteration of the assemblage. A disk, such as indicated at 12, carried by and outwardly projecting circumferentially from the enlarged end of the flared portion 11, carries a rim 13 which may be of the one piece drop center type. The disk is provided with a series of openings 14 through which stud bolts, not shown, carried upon the vehicle brake drums and the like may project to accommodate cap nuts or other fittings.

The frusto-conical shaped member 15 telescopically associated with the outermost projecting portion of the hub and abutting the intersecting walls of the latter with the flared portion 11 is provided with a multiplicity of radially disposed openings or pockets 16 arranged at regular intervals and opening to the outer periphery thereof.

A locking element 17 of sleeve like formation, telescopically associated and threadedly secured to the hub 10, is provided with a frusto-conical shaped portion 18 wedged or otherwise frictionally disposed between the immediate faces of the hub and frusto-conical shaped member 15 in the manner best shown in Figure 2.

Struts or spoke members 19, receivable at their innermost ends within the pockets or openings 16 in the frusto-conical shaped member 15, terminally abut the adjacent surfaces of the sleeve 17. A flange portion 20, carried upon the sleeve member 17 engages the outer sides of the spokes or struts 19 to force or otherwise retain the spokes within the pockets or openings 16 and from which positions the latter may not become accidentally displaced. A nut or other locking element, such as indicated at 21, is employed upon the outermost projecting portion of the hub 10 to abut the outermost extremity of the sleeve 17 whereby the latter will be lockingly retained in position for use. A wrench engaging portion or face 22 is formed upon the sleeve 17 whereby the latter may be individually turned to tighten the spokes or struts. The other ends of the struts or spokes are projected for appreciable distances within openings formed in the rim 13 and restricted as to such movement through the provision and arrangement of circumferentially disposed enlarged shoulder portions 23. From the illustration of my invention in Figure 2 of the drawings, it is understood that the spokes or struts 19 follow the angularity assumed by the assemblage in order that the disk 12 will cooperate therewith in the maintenance of the rim in proper working position. A hub cap or other covering 24 is threadedly associated with the sleeve 17 through the instrumentality of a boss 25 especially provided for the purpose.

As shown in Figures 1 and 2 of the drawings, the outer face of the disk 12, between the association of the outwardly flared portion 11 and the rim 13 is provided with a multiplicity of intersecting embossed portions 26 so arranged as to simulate the effect of additional spokes of the wire wheel type.

The invention is susceptible of various changes in its form, proportions and minor details of construction and the right is herein reserved to make such changes as properly fall within the scope of the appended claim.

Having described the invention, what is claimed is:

A vehicle wheel structure comprising a hub supporting a disk, a rim mounted upon the disk, a frusto-conical shaped member telescopically associated with the hub having pockets opening to the periphery of its outermost end, a sleeve member adjustably connected with the hub having a portion disposed for telescopic association to lockingly maintain the frusto-conical shaped member in position for use, struts projected within said openings for abutting engagement with the mentioned portion of the sleeve member at their innermost ends and engageable at their other ends with the rim, and a flange mounted upon the sleeve disposed at right angles to the pockets to overlie the outer sides of said struts for retaining same within said pockets.

In testimony wherof I affix my signature.

WILLIAM T. BRENNEN.